Figure 1:
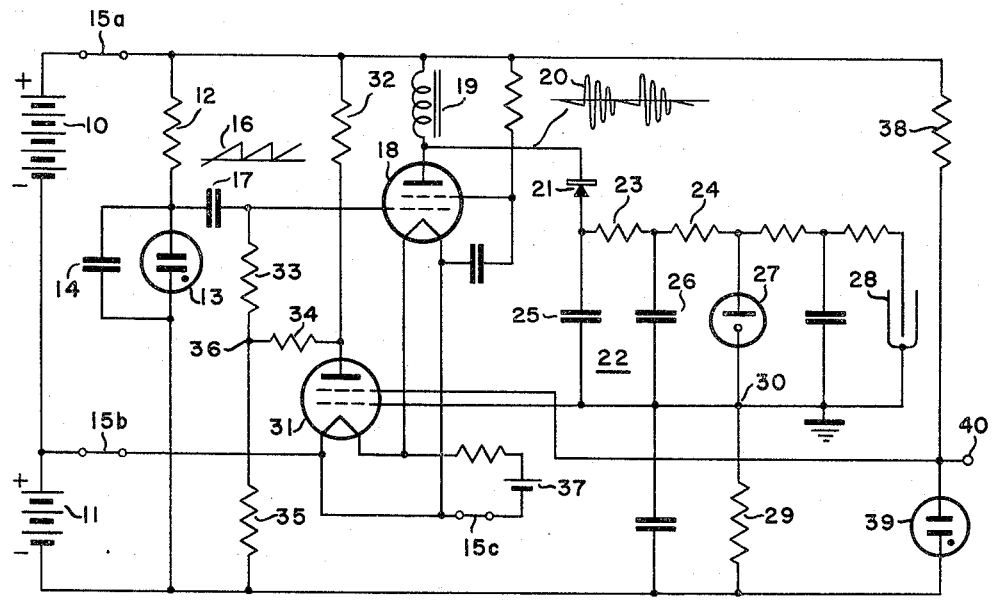

Sept. 16, 1958     W. P. KERN     2,852,729

HIGH-VOLTAGE POWER SUPPLY

Filed March 23, 1953

*INVENTOR*
WALTER P. KERN

BY *Spencer E. Olson*

*ATTORNEY*

United States Patent Office 2,852,729
Patented Sept. 16, 1958

2,852,729

HIGH-VOLTAGE POWER SUPPLY

Walter P. Kern, Boston, Mass., assignor to Tracerlab, Inc., Boston, Mass., a corporation of Massachusetts Application March 23, 1953, Serial No. 344,007

5 Claims. (Cl. 321—2)

This invention relates generally to radiation measuring equipment, and more particularly to portable high voltage power supplies for radiation detectors such as a Geiger tube or scintillation detector.

In the past many types of power supplies have been used for operating Geiger tubes, but none of the devices developed by the art have been readily adaptable for portable use. An obvious type of power supply for a Geiger tube is a pack of special high voltage batteries; however, batteries are bulky and expensive and have limited life and attendant voltage instability. Radio frequency oscillators have also been used for generating high voltages which are then rectified for Geiger tube use, but this type of supply is also expensive, has low efficiency, and transmits radiation which may be objectionable. Parallel-series capacitor charging systems have been used to obtain the relatively high voltages required for Geiger tube operation with relatively less bulk than is required with batteries alone, but the rather rapid discharge of the capacitors by leakage and normal drain due to the Geiger tube operation results in poor voltage regulation. Vibrators have also been used to provide high voltages in portable supplies, but because of the mechanical weaknesses of the vibrator and the rather low efficiency of this type of conversion, supplies of this type leave much to be desired. Finally, simple relaxation oscillators have been used to generate high voltage pulses which are rectified and filtered to provide a high voltage supply from a low voltage primary source consisting of dry batteries. This type of supply is reasonably suitable, but presently available circuits have relatively poor regulation, are rather inefficient and have short battery life.

The present invention is concerned with the latter type of power supply and consists in an improvement thereof to overcome the shortcomings of the prior art circuit.

Hence, one of the objects of the present invention is to provide a portable high voltage power supply for Geiger tubes and other radiation detectors requiring regulated high voltage at low current drain.

Another object of the present invention is to provide a high voltage power supply from a primary source composed of dry cells and arranged to produce low drain on the dry cells.

A further object of the present invention is to provide a portable high voltage power supply which is compact, relatively inexpensive, and which provides good voltage regulation throughout the life of a low voltage dry battery which is used as the primary source.

The invention is featured by the provision, in combination, of a neon-tube relaxation oscillator coupled to a current amplifier having an inductance in its plate circuit for producing high voltage pulses, means for rectifying the high voltage pulses, a corona regulator tube, and a feedback circuit arranged to control the bias on the current amplifier in response to the current flow in the regulator tube so as to maintain the amplitude of the current pulses through the inductance just large enough to obtain the desired output voltage and current. This control of the bias of the current amplifier prevents the waste of current in the regulator and accordingly appreciably extends the life of the batteries used in the relaxation oscillator.

Figure 2:
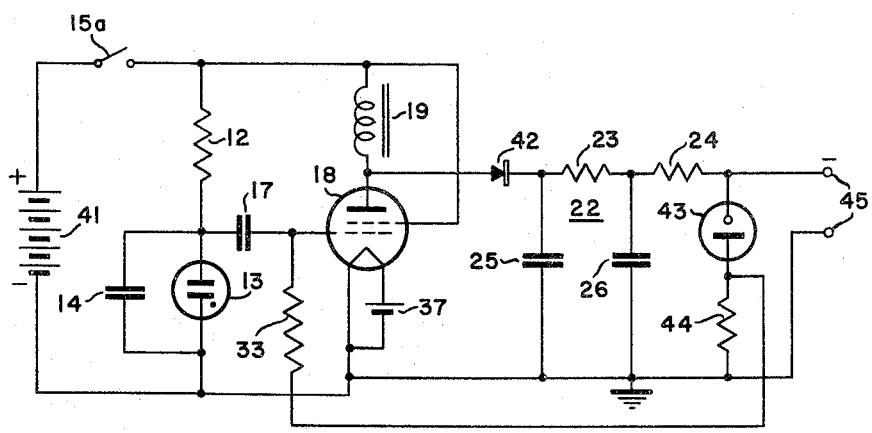

Other objects, features and advantages of the invention will appear from the following detailed description when considered in connection with the accompanying drawings in which:

Fig. 1 is a circuit diagram of a power supply in accordance with the present invention for providing a positive high voltage; and Fig. 2 is a modification of the circuit of Fig. 1 for providing a regulated negative high voltage.

Referring to Fig. 1, the circuit of the present invention includes a conventional relaxation oscillator consisting of batteries 10 and 11, resistor 12 and neon tube 13, connected in series as shown, and condenser 14 connected across neon tube 13. When switch 15 is closed, condenser 14 starts to charge toward the voltage of batteries 10 and 11, and when the firing potential of neon tube 13 is reached, tube 13 conducts rapidly discharging condenser 14. This action is repetitive, resulting in a periodic sawtooth waveform 16 being generated at the upper electrode of neon tube 13. Resistor 12 and condenser 14 are so proportioned relative to the voltage of batteries 10 and 11 that signal 16 is of audio frequency. The output of the oscillator is coupled via condenser 17 to the control grid of tube 18 having an inductance 19 in its plate circuit. Due to the periodic rapid collapse of the magnetic field in inductance 19 by the sudden cutting off of tube 18 by the trailing edge of each sawtooth, the inductance 19 together with its stray capacitance "rings" producing a series of very high voltage spikes 20 at the anode of tube 18. The positive half-cycles of signal 20 are rectified by a suitable rectifier 21, preferably a cold cathode or selenium rectifier so as not to require filament power, although, of course, a thermionic diode may be used if desired. The rectified high voltage is filtered by filter 22, including resistors 23 and 24 and condensers 25 and 26, and applied to the plate of a suitable corona regulator tube 27, such as a Victoreen 5841, the regulator tube 27 being designed to maintain a voltage thereacross of a magnitude equal to the voltage desired for application to the center wire of Geiger tube 28.

With a well-designed corona regulator tube 27, reasonable regulation is obtainable, but the circuit thus far described draws considerable current for regulation purposes. Assuming that it is desired to regulate at 900 volts, it is necessary to provide a voltage at the cathode of rectifier 21 such that that voltage minus the sum of resistors 23 and 24 times the minimum current in regulator tube 27 necessary for proper regulation equals 900 volts. If the necessary voltage to provide these conditions is to be available when batteries 10 and 11 are near the end of their useful life, it is obvious that when the batteries are new, more current than is necessary to produce the desired voltage is drawn by tube 18 with the result that the battery drain is high and life consequently short.

In accordance with the present invention, the bias on tube 18 is automatically controlled in response to the current in regulator tube 27 in such a way that the current drawn by tube 18 at any time during the useful life of the batteries is just enough to maintain the desired voltage across regulator tube 27 with a minimum of current through tube 27. The feedback loop includes resistor 29 of suitable value connected to the cathode of voltage regulator 27 to provide a positive signal at point 30 proportional to the current flowing through the regulator branch of the circuit. This positive signal is coupled to the control grid of direct current amplifier tube 31, the anode of which is connected to the positive terminal of battery 10 via resistor 32 and the cathode of which is connected to the positive terminal of battery 11. The grid resistor 33 of amplifier 18 is connected to the anode of tube 31 via resistor 34 and to the negative terminal of battery 11 via resistor 35, point 36 being maintained at a negative potential relative to the cathode of tube 18 depending on the current flow in tube 31. Resistors 29, 33, 34 and 35 are so chosen, that as the current through regulator tube 27 increases, the positive voltage coupled to the grid of tube 31 increases resulting in a decrease in the potential at point 36 and an increase in the negative bias on tube 18. This increase in bias on tube 18 has the effect of decreasing the current flow in tube 18 during the portion of waveform 20 which precedes the "ringing" oscillations to a level such that the voltage at the cathode of rectifier 21 is reduced to a level whereby minimum regulation current flows through regulator tube 27. Thus, when batteries 10 and 11 are new, current flow in tube 18 in excess of what is necessary to provide the desired regulated value is avoided, thereby increasing battery life by an appreciable amount. The automatic control of the magnitude of the pulses from tube 18 has the attendant advantage of improving the operation of regulator tube 27 since the magnitude of the voltage applied to the regulator fluctuates only slightly from the desired regulated voltage.

The filamentary cathodes of tubes 18 and 31 are both energized from battery 37, and tube 31 is stabilized by connecting its screen grid to a source of regulated voltage. A suitable source of regulated voltage for this purpose is provided by resistor 38 and neon lamp 39 connected in series across batteries 10 and 11. The regulated voltage at terminal 40 may also be utilized in an external circuit, and the light produced by lamp 39 provides a convenient indicator for showing battery condition.

In a typical circuit constructed according to Fig. 1 and operated satisfactorily to provide a regulated 900 volt positive voltage, the various components were of the following values and types:

*Tubes*

| | |
|---|---|
| 13, 39 | NE-2. |
| 18, 31 | CK526AX. |
| 21 | CK1036. |
| 27 | Victoreen 5841. |

*Resistors*

| | | |
|---|---|---|
| 12 | meg | 12 |
| 23, 24 | meg | 22 |
| 29 | meg | 8.2 |
| 32 | k | 390 |
| 34, 35 | meg | 3.9 |
| 33 | meg | 6.8 |
| 38 | k | 150 |

*Capacitors*

| | | |
|---|---|---|
| 14 | mmf | 680 |
| 17 | mmf | 50 |
| 25, 26 | mf | .01 |

*Batteries*

| | |
|---|---|
| 10 | (2) XX30,—45 v. |
| 11 | XX30,—45 v. |

While the circuit of Fig. 1 is particularly useful where a positive high voltage is necessary, portable radiation detecting instruments using photomultiplier tubes are usually designed to use regulated negative high voltage supply. A suitable circuit for achieving a regulated negative voltage incorporating the present invention and possessing the advantages of the previously described circuit is illustrated in Fig. 2. The relaxation oscillator and current amplifier portions of the circuit are the same as in the circuit of Fig. 1 except that batteries 10 and 11 have been replaced by a single 90 volt battery 41 and cathode of tube 18 is connected to ground. Rectifier 42 is reversed from Fig. 1 to rectify the negative half-cycles of the oscillations appearing at the anode of tube 18, the resulting negative voltage being filtered by filter 22 and applied to the cathode of corona regulator tube 43. Resistor 44 is connected between the anode of regulator tube 43 and ground, and the anode is connected to grid resistor 33 of tube 18. As the current in the regulator branch increases beyond that necessary for operation of tube 43, the voltage at the anode of tube 43 decreases, thus reducing the voltage on the grid of tube 18 and increasing its negative bias so as to reduce the current in the regulator branch. The operation, therefore, is similar to the circuit of Fig. 1, except that the direct current amplifier for phase-inversion is unnecessary. A regulated negative voltage is available at output terminal 45.

While the described neon lamp relaxation oscillator for cyclically rendering tube 18 conducting and non-conducting is suitable for most purposes, and is usually desirable because of its simplicity and low cost, it will be understood that other types of oscillators, for example, a multivibrator, may be substituted without departing from the spirit of the invention. The square wave output of a multivibrator permits more accurate control of the periods of conduction and non-conduction of tube 18 than that afforded by the sawtooth output of the disclosed relaxation oscillator thus permitting a slight improvement in the control of the current drawn by tube 18, but otherwise the operation is the same.

While there have been shown and described the novel features of the invention as applied to preferred embodiment, it will be understood that various omissions and other substitutions and changes may be made by those skilled in the art, without departing from the spirit of the invention. It is the intention, therefore, to be limited only as indicated by the scope of the appended claims.

What is claimed is:

1. A high voltage power supply comprising, in combination, an electron tube having at least an anode, a cathode and a control grid, an inductance connected in the anode circuit of said tube, means connected to the control grid of said tube for cyclically rendering said tube conducting and non-conducting, the non-conduction of said tube causing the magnetic field of said inductance to collapse whereby high voltage oscillations appear at the anode of said tube, means for rectifying said oscillations to derive a unidirectional voltage, a two-electrode corona regulator tube and a resistor connected in series between one electrode thereof and said cathode, means for applying said unidirectional voltage to the other electrode of said corona regulator tube whereby there appears across said resistor a signal proportional to the current drawn by said regulator tube, and a feedback connection from said resistor to the control grid of said electron tube arranged to vary the bias on said tube in response to said signal in a direction to maintain the current in said corona regulator tube at a predetermined minimum value.

2. A high voltage power supply comprising, in combination, an electron tube having at least an anode, a cathode and a control grid, an inductance connected in the anode circuit of said tube, means connected to the control grid of said tube for cyclically rendering said tube conducting and non-conducting, the non-conduction of said tube causing the magnetic field of said inductance to collapse whereby high voltage oscillations appear at the anode of said tube, means for rectifying said oscillations to derive a unidirectional voltage, a two-electrode corona regulator tube and a resistor connected in series between one electrode thereof and said cathode, means for applying said unidirectional voltage to the other electrode of said corona regulator tube whereby there appears across said resistor a signal proportional to the current drawn by said regulator tube, and a feedback connection including a direct current amplifier between said resistor and the control grid of said electron tube arranged to vary the bias on said electron tube in proportion to said signal so as to maintain the amplitude of said oscillations at just the level necessary to provide a minimum predetermined regulation current in said corona regulator tube.

3. A high voltage power supply comprising, in combination, an electron tube having at least an anode, a cathode and a control grid, an inductance connected in the anode circuit of said tube, means connected to the control grid of said tube for cyclically rendering said tube conducting and non-conducting, the non-conduction of said tube causing the magnetic field of said inductance to collapse whereby high voltage oscillations appear at the anode of said tube, means for rectifying said oscillations to derive a unidirectional voltage, a two-electrode corona regulator tube and a resistor connected in series between one electrode thereof and said cathode, means for applying said unidirectional voltage to the other electrode of said corona regulator tube whereby there appears across said resistor a signal proportional to the current drawn by said regulator tube, and a feedback connection including a direct current amplifier between said resistor and the control grid of said electron tube arranged to vary the bias on said electron tube in proportion to said signal so as to maintain the amplitude of said oscillations at just the level necessary to provide a minimum predetermined regulation current in said corona regulator tube.

4. A high voltage power supply comprising, in combination, a first electron tube having at least an anode, a cathode and a control grid, an inductance connected in the anode circuit of said first tube, a relaxation oscillator connected to the control grid of said first tube for supplying positive pulses of sawtooth waveform thereto, said first tube periodically interrupting the flow of current in said inductance as the tube is rendered non-conductive at the termination of each pulse whereby high voltage oscillations appear as the anode of said tube, means for rectifying said oscillations to derive a unidirectional voltage, a corona regulator tube having an anode and a cathode, a resistor connected in series between the cathode of said corona regulator tube and the cathode of said first electron tube, means for applying said unidirectional voltage to the anode of said corona regulator tube whereby there appears across said resistor a signal proportional to the current drawn by said regulator tube, a direct current amplifier including a second electron tube having at least an anode, a cathode direct-coupled to the cathode of said first electron tube and a control grid, a connection from the cathode of said regulator tube to the control grid of said second tube for coupling said signal thereto, and means resistively connecting the anode of said second tube to the control grid of said first tube, said direct current amplifier being arranged to vary the bias on said first electron tube in proportion to said signal and in a direction to maintain the amplitude of said oscillations at just the level necessary to provide a minimum predetermined regulation current in said corona regulator tube.

5. A high voltage power supply comprising, in combination, a first electron tube having at least an anode, a cathode and a control grid, an inductance connected in the anode circuit of said first tube, a relaxation oscillator connected to the control grid of said first tube for supplying positive pulses of sawtooth waveform thereto, said first tube periodically interrupting the flow of current in said inductance as the tube is rendered non-conductive at the termination of each pulse whereby high voltage oscillations appear at the anode of said tube, means for rectifying said oscillations to derive a unidirectional voltage, positive with respect to a first point of reference voltage, a corona regulator tube having an anode and cathode, means connecting the cathode of said regulator tube to said first point of reference voltage, a resistor connected between said first point of reference voltage to a second point of reference voltage negative with respect to the first, means for applying said unidirectional voltage to the anode of said corona regulator tube whereby there appears across said resistor, a signal proportional to the current drawn by said regulator tube, a direct current amplifier including a second electron tube having at least an anode, a cathode and a control grid, a connection from the cathode of said regulator tube to the control grid of said second tube for coupling said signal thereto, means for direct-coupling the cathodes of said first and second electron tubes to said second point of reference voltage, and a resistive connection between the anode of said second tube and the control grid of said first tube, the parameters of said direct current amplifier being selected and arranged to vary the bias on said first tube in response to said signal and in a direction to maintain the amplitude of said oscillations at just the level necessary to provide a minimum predetermined regulation current in said corona regulator tube.

References Cited in the file of this patent

UNITED STATES PATENTS

| | | |
|---|---|---|
| 1,959,010 | Tillegrun | May 15, 1934 |
| 2,306,888 | Knick | Dec. 29, 1942 |
| 2,431,051 | Kozanowski | Nov. 18, 1947 |
| 2,435,414 | Sziklai et al. | Feb. 3, 1948 |
| 2,459,638 | Fyler | Jan. 18, 1949 |
| 2,591,942 | Janssen | Apr. 8, 1952 |
| 2,637,011 | Schwarz | Apr. 28, 1953 |

FOREIGN PATENTS

| | | |
|---|---|---|
| 893,135 | France | May 31, 1944 |